Patented Oct. 3, 1950

2,524,291

UNITED STATES PATENT OFFICE 2,524,291

OIL BASE COATINGS

Harold A. Hoffman, New York, N. Y.

No Drawing. Application January 19, 1948,
Serial No. 3,169

10 Claims. (Cl. 99—148)

This invention relates to colored casings and toppings for ice cream, confectionary and other foods, and in particular is directed to colored non-aqueous oil-base coatings wherein the coloring ingredient thereof is a non-oil-soluble United States certified food color.

The casings and toppings or coatings for ice cream, confectionery and other foods are divided into two major types. These are: (1) oil-base coatings, and (2) water-containing plastic icings.

Oil-base coatings, used especially for the coating or enrobing of ice cream and confectionery, are products which contain but negligible quantities, if any, of water. For example, the familiar chocolate casing or coating for ice cream confections such as bars or pops on a stick is produced by dipping the article into the liquefied casing material. Upon withdrawal, the adherent film of the casing material rapidly dries and congeals to a smooth, uniform coating of chocolate. The general basic composition of such a coating is approximately as follows: 50 to 65% of an oily base, as for example, cocoa butter, coconut oils, other vegetable oil or combinations thereof; 20 to 35% of powdered sugar; 2 to 5% of dried milk solids; and about 10 to 15% of non-fat cocoa solids. In the case of pure chocolate coatings the basic general or average composition is: pure chocolate liquor—40 to 50%; powdered sugar—35%; and added cocoa butter—25%. Generally, the coatings should also contain a small amount (about 0.2 to 0.5%) of a stabilizer to produce a low viscosity product, for economy in use and easy control of the film thickness. Unstabilized coatings are generally too viscous for economical use because of excessive film thickness and the difficulty of controlling the same. The cost of casing from an unstabilized coating is high as contrasted with casing from a stabilized coating because it is not possible to coat the maximum number of articles per unit weight of the coating used.

Such coatings are applied by first liquefying the materal, and then dipping the product to be cased into the dipping bath; withdrawing the coated articles and allowing the excess to drain off, with resultant congealing of the coating which adheres to the article.

When the article to be coated is ice cream, congealing of the casing is aided by the low temperature of the ice cream core so that the melting or solidification point of the coating may be lower than that required for confectionery or baked goods. With the latter products, the coatings usually must congeal at average room temperatures. The desired solidification point of a coating is customarily provided for by appropriately proportioning the oil mixture ingredients used in preparing the coating. Such coatings contain no, or if any but a negligible quantity of water.

Plastic icings may be classified into two major groups: (1) chocolate-flavored icings, and (2) fruit or other flavored icings. The general basic composition of a chocolate-flavored icing is: about 10 to 15% of oils such as vegetable shortenings and vegetable oils, or combinations thereof; 65 to 75% of powdered sugar; 10 to 15% non-fat cocoa solids; and 10 to 15% water.

Fruit-flavored icings have a basic general composition of: 12 to 18% of oils such as vegetable oils and vegetable shortenings or combinations thereof; 75 to 85% of powdered sugar; 10 to 15% of water; and water-soluble coloring and flavoring ingredients as desired.

The average water content of such icings (chocolate and fruit flavored) is about 13 to 14%. In commercial operations, the water is added to the mixture of the basic ingredients just prior to the preparation and use of the icing as a decoration for baked goods, confectionery products, and other articles. The freshly prepared icing is a plastic paste, and is applied to the surface of the cake or other articles by spreading it manually with a spatula or other appropriate tool. The icings are almost always never used as casings for ice cream products because of the disadvantages from the standpoint of (1) economic considerations and (2) inherent characteristics. Thus, it is almost impossible to use a plastic icing as a casing for ice cream, in large scale production operations, because of the difficulty in controlling film thickness. They cannot be manipulated as free flowing liquids since they are plastic viscous masses. Dilution of the plastic mass with water to produce a free-flowing material results in a product which cannot practically be used for casing or dipping, as the congealing or solidifying point of such a product is far below the average room temperature. In marked contrast with such a solidifying point, the congealing point of oil-base coatings may be readily controlled within relatively close operating ranges.

An oil-base coating possesses a smooth texture, due to the fine particle size of the sugar and the milk solids, which is pleasantly noticeable when the coating is eaten, whereas an icing, if used as a coating, is generally much more grainy to the taste. With water present in the composition, if icings could be used as casings on ice cream products, there is also the possibility of resultant large crystal growth formation of the ice particles. Such particles would then be gritty and wholly objectionable, not only in lacking the necessary characteristics of a coating but also in possessing markedly unpalatable taste and unpleasant physical structure.

Heretofore it has not been possible to produce a full spectrum of colored oil-base coatings using United States certified food colors as the tinctorial agents. The food industry has long sought a full spectrum of oil-base colored coatings in a wide variety of appropriate flavors so that such coatings could be used and applied with the ease and advantages inherent in an oil-base product such as the familiar chocolate and chocolate-flavored coating employed in the ice cream, confectionery, baking and related arts.

Accordingly, it is one of the principal objects of this invention to provide a product embodying a water-soluble U. S. certified food color which may be used to expand the spectrum of colors for oleaginous food products beyond the present limited range of available certified oil-soluble food colors.

Another object of the invention is to provide a product embodying a water-soluble U. S. certified food color which may be used to impart color to a non-aqueous oil-base coating.

Another object of this invention is the provision of an essentially non-aqueous oil-base coating for food products which may be provided in a wide variety of colors using water-soluble certified food colors as the tinctorial agent.

Another object of this invention is the provision of an essentially non-aqueous oil-base coating for food products in a wide variety of colors which possesses the ease of application and desirable characteristics of a chocolate coating.

Another object of this invention is the provision of ice-cream pops and kindred articles having coatings of a wide variety of colors and possessing the desirable characteristics of a chocolate coating.

Another object of this invention is the provision of ice-cream pops and kindred articles having coatings in a wide variety of colors which may be applied with the ease and facility afforded by chocolate coatings.

Another object of this invention is to provide the art with color concentrates embodying water-soluble U. S. certified food colors which may be used in the preparation of essentially non-aqueous products in a wide variety of colors.

Another object of this invention is to provide the art with products (made from water-soluble U. S. certified food colors) in a wide variety of colors of visually uniform appearance which may be used as if the products were oil-soluble colors.

The gist of my invention lies in (a) the provisions of a color concentrate consisting of a water-in-oil emulsifying agent, as for example lecithin, in which there is a visually uniform distribution of a small quantity of a concentrated aqueous solution of water-soluble U. S. certified food color; (b) the provision of a color base consisting of the aforesaid color concentrate which is thoroughly distributed in an edible oil; and (c) the provision of an oil-base coating composed of the ingredients customarily used for the preparation of oil-base coatings and colored either by the color concentrate or the color base, as said products are described above, together with an appropriate flavoring.

Illustrative examples of coatings prepared in accordance with the principles of this invention are:

EXAMPLE I

GREEN COATING (LIME FLAVORED)

Preparation A

COLOR CONCENTRATE

I dissolved 0.33 grams of brilliant blue and 3.0 grams of tartrazine in 40 cc. of water at a temperature of from 190–200° F. This highly concentrated solution of the mixed dyes was then slowly added with stirring to 200 grams of melted lecithin held at a temperature of 160–180° F. until a visually uniformly appearing dark green paste was produced. This was the color concentrate.

Preparation B

COLOR BASE

I thoroughly mixed the entire amount of the color concentrate (Preparation A above) with a sufficient amount of 76° coconut oil (approximately 9¼ lbs.) to bring the total weight to 10 lbs. and obtained a uniform green colored paste. This was the color base.

Preparation C

GREEN LIME FLAVORED OIL-BASE COATING

I made a uniform mixture of 30 lbs. of finely pulverized sugar (6X) with 4 lbs. of dried milk powder and 1 oz. of powdered citric acid. Then, with constant mixing, I steadily added 56 lbs. of 76° coconut oil to the above mixture, after which I added 10 lbs. (the entire mass) of the green color base (Preparation B). The mixing was continued until the product was uniform. At this point I added 75 cc. of oil of limes and thoroughly mixed this flavoring ingredient with the mass to obtain the final product.

EXAMPLE II

GREEN COATED ICE-CREAM POPS

I liquefied the green coating (Preparation C of Example I) by heating the same to approximately 90° F. and dipped ice cream pops (a vanilla ice-cream bar on a stick) into the liquefied coating; immediately withdrew the pop; allowed it to drain; and observed that a quick drying, green colored coating formed on the pop. The coating of this pop possessed the highly desirable characteristics inherent in a good oil-base coating. The coating was pleasantly chewable and of smooth, uniform texture.

EXAMPLE III

GREEN COATED DOUGHNUTS

I made a green colored, lime flavored coating in accordance with the method of Preparation C except that the 56 lbs. of coconut oil was composed of 47 lbs. of 76° coconut oil and 9 lbs. of 110° coconut oil. I obtained a final product having an average solidifying point about 5–7° F. higher than that of Preparation C. I then liquefied this coating and while holding it at a temperature of approximately 95° F. I dipped doughnuts therein. On withdrawing, the coated doughnuts were allowed to drain and I observed that a quick-drying, green colored coating formed on the doughnuts. The coating possessed the highly desirable palatable characteristics inherent in a good oil-base coating.

EXAMPLE IV

GREEN COATED CONFECTIONS

I used the liquefied coating of Example III and dipped vanilla flavored fondant centers therein. On withdrawing, the coating solidified, with the formation of green colored, lime flavored bon bons having the exceedingly pleasant and palatable characteristics inherent in an oil-base coating.

The aforesaid green color concentrate and green color base have been used for the preparation of peppermint, spearmint, pistachio and other flavor coatings which are usually associated with a green color. The method of preparation is precisely the same as described in Example I, Preparation C, or Example III, except that the flavor is imparted to the coating by the use of an ingredient having the particular flavoring characteristic desired.

In accordance with the foregoing methods for the preparation of the various products described, I have prepared coatings in a variety of colors and flavors.

For example, using red color concentrates I have prepared coatings of the following flavors: cherry, raspberry, strawberry, black raspberry, boysenberry and the like, by the selection of the appropriate flavoring ingredient which is introduced into the red color coating prepared in accordance with the method described under Preparation C above.

I have prepared yellow color concentrates, color bases and coatings in accordance with the general method described for the green colored products except that a water-soluble U. S. certified yellow food color was used in place of the colors which impart a green color. These yellow coatings have been given flavors such as peach, lemon, banana, pineapple and apricot by using flavoring ingredients of the appropriate type.

By using a small quantity of the yellow color in the preparation of the coating I have obtained cream or ivory colored coatings for the preparation of coconut and vanilla flavored coatings.

For the preparation of orange colored coatings I have used appropriate water-soluble U. S. certified food colors and flavoring ingredients which impart an orange or tangerine flavor to the final product.

In the same manner I have made purple colored coatings by using appropriate water-soluble U. S. certified food colors and flavored the same with a grape flavoring product. Other types of fruit flavors may also be readily prepared in accordance with the general method described above.

For the preparation of such products as burnt almond, butter pecan, butter scotch and caramel, and the like, customarily associated with a brownish tint, coatings are prepared in the same way, except that the tinctorial agent used is a combination of red, yellow and blue U. S. certified food colors so proportioned as to impart a brownish shade to the ultimate product, and the flavoring ingredient is selected in accordance with the particular flavor desired.

It will be understood that the water-soluble certified color is distributed in the essentially non-aqueous oil-base coating by the use of a minimal amount of a vehicle in which the color is soluble, whereby the solution of the color is visually uniformly distributed in the water-in-oil emulsifying agent. The essentially non-aqueous character of the coating is evidenced by the fact that the water-content thereof ranges from about 0.1 to 0.5% as contrasted with the plastic icings which contain a very substantial amount of water. There may be used in place of the water as the solubilizing agent for the certified color a mixture of water and glycerine or other appropriate menstruum. There may also be used as the emulsifying agent (containing the visually, uniformly appearing distribution of the water-soluble certified color) to effectuate the distribution of the color in the oil, as the equivalent of the lecithin hereinabove described, edible emulsifying agents such as the partial long chain fatty acid esters of polyhydric alcohols, or the polyalkylene oxide derivatives thereof or the anhydrid derivatives of said polyhydric alcohols and the polyalkylene oxide derivatives thereof. Such esters are made from fatty acids such as lauric, palmitic, stearic, oleic and the like, and the polyhydric alcohols used are the glycols, glycerols, hexitols and the like. The polyalkylene oxide derivatives of such esters are derived from polyethylene oxide, polypropylene oxide compounds and the like customarily used in preparing such esters.

It will be understood that the foregoing illustrations of the products which may be prepared in accordance with the principles of this invention are merely illustrative embodiments thereof and that it is possible to prepare color concentrates, color bases and coatings in ways other than those given in the specific formulations without departing from the spirit of this invention. Accordingly, the appended claims are to be understood as defining the invention within the full spirit and scope thereof.

I claim:

1. A flavored and appropriately colored essentially non-aqueous oil base coating for food products comprising: an edible oil; an emulsifying agent containing a dispersion of a water-soluble certified food color dissolved in an amount of an aqueous vehicle sufficient to form a concentrated solution of said food color; pulverized sugar; and milk powder.

2. A flavored and appropriately colored essentially non-aqueous oil base coating for food products comprising: an edible oil; lecithin containing a water-soluble U. S. certified food color dissolved in an amount of an aqueous vehicle sufficient to form a concentrated solution of said food color; pulverized sugar; and milk powder.

3. A flavored and appropriately colored essentially non-aqueous oil base coating for food products comprising: an edible oil; lecithin containing a water-soluble U. S. certified food color dissolved in an amount of an aqueous vehicle sufficient to form a concentrated solution of said food color; pulverized sugar; milk powder; and a flavoring ingredient.

4. Method of preparing a flavored and appropriately colored essentially non-aqueous oil base coating for food products comprising: dissolving a water-soluble certified food color in water to make a concentrated solution thereof; distributing said solution in an edible emulsifying agent to obtain a visually uniformly colored mass; distributing the uniformly colored emulsifying agent in an edible oil; and blending the edible oil thus prepared with sugar and milk powder.

5. A color base for imparting color to essentially non-aqueous oil base coatings for food products comprising essentially: an emulsifying agent containing a water-soluble certified food color dissolved in an amount of water sufficient to form a concentrated solution of said color; and an edible oil.

6. A color base for imparting color to essentially non-aqueous oil base coatings for food products comprising essentially: lecithin containing a water-soluble certified food color dissolved in an amount of water sufficient to form a concentrated solution of said color; and an edible oil.

7. A flavored and appropriately colored essentially non-aqueous oil base coating for food products comprising an edible oil, an emulsifying agent containing a dispersion of a water-soluble certified food color dissolved in an amount of an aqueous vehicle to form a concentrated solution of said certified food color, and pulverized sugar.

8. A color concentrate for imparting color to an essentially non-aqueous oil base coating for food products which consists essentially of an emulsifying agent containing a dispersion of a water-soluble certified food color dissolved in an amount of an aqueous vehicle sufficient to form a concentrated solution of said certified food color.

9. A color concentrate for imparting a color to essentially non-aqueous oil base coatings for food products which consists essentially of lecithin containing a dispersion of a water soluble certified food color dissolved in an amount of water sufficient to form a concentrated solution of said certified food color.

10. Method of preparing a flavored and appropriately colored essentially non-aqueous oil base coating for food products comprising dissolving a water-soluble certified food color in water to make a concentrated solution thereof, distributing said solution in lecithin to obtain a visually uniform colored mass, distributing the said uniformly colored mass in an edible oil, and blending the edible oil thus prepared with sugar and milk powder.

HAROLD A. HOFFMAN.

REFERENCES CITED

The following references are of record in the file of this patent:

UNITED STATES PATENTS

| Number | Name | Date |
| --- | --- | --- |
| 1,919,025 | Jones et al. | July 18, 1933 |
| 1,953,438 | Schlack | Apr. 3, 1934 |